No. 668,857. Patented Feb. 26, 1901.
G. U. MERRILL.
SUPPORT FOR ENGINE LUBRICATORS.
(Application filed July 11, 1900.)
(No Model.)
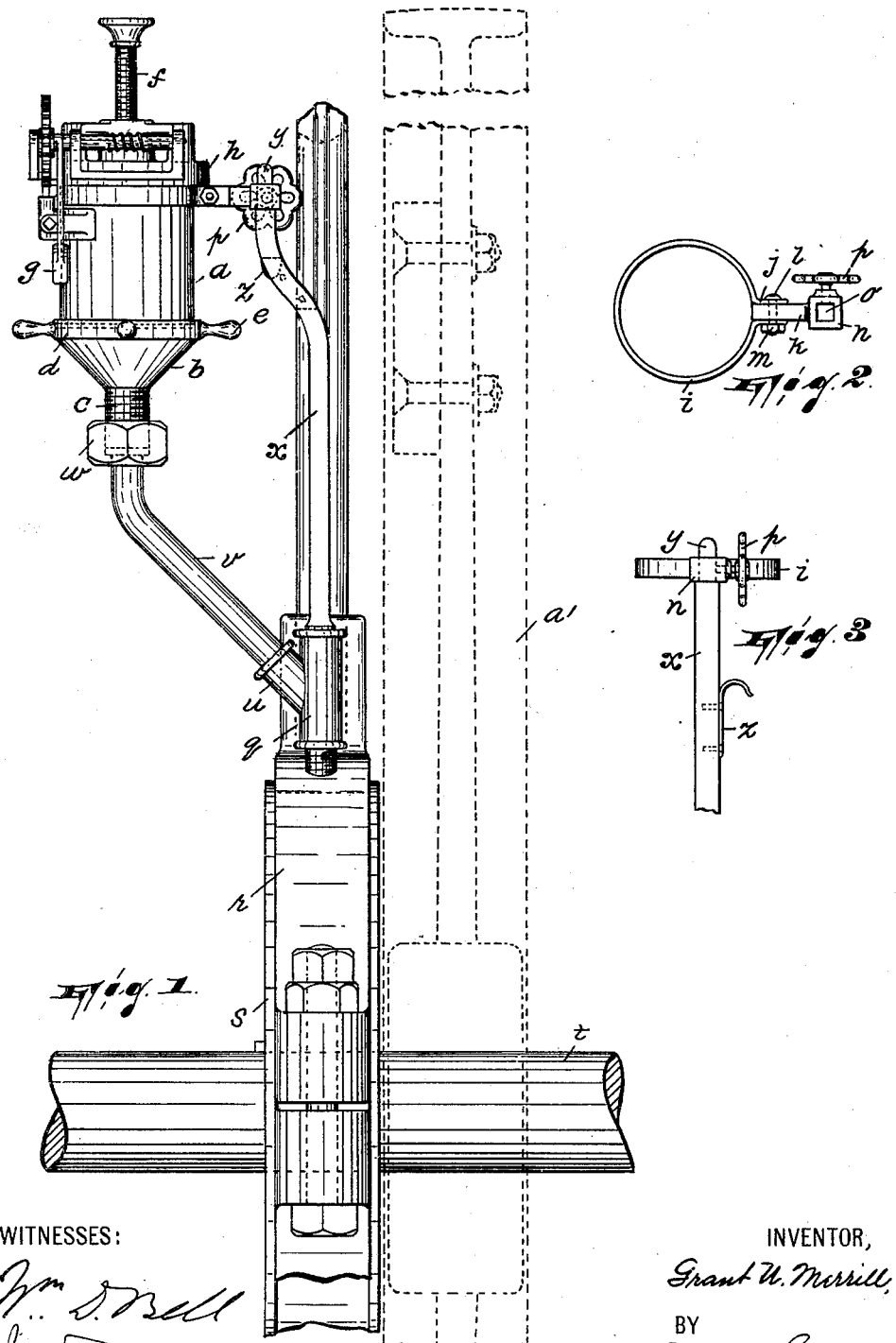
WITNESSES:
INVENTOR,
Grant U. Merrill,
BY
Gartner & Steward,
ATTORNEYS.

UNITED STATES PATENT OFFICE.

GRANT U. MERRILL, OF PATERSON, NEW JERSEY.

SUPPORT FOR ENGINE-LUBRICATORS.

SPECIFICATION forming part of Letters Patent No. 668,857, dated February 26, 1901.

Application filed July 11, 1900. Serial No. 23,210. (No model.)

*To all whom it may concern:*

Be it known that I, GRANT U. MERRILL, a citizen of the United States, residing in Paterson, in the county of Passaic and State of New Jersey, have invented certain new and useful Improvements in Supports for Engine-Lubricators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to engine-lubricating apparatus.

The object of the invention is to provide a lubricator with means whereby when said lubricator is mounted in operative position upon a bearing of an engine such part thereof as must be disconnected in order to refill the receptacle for the lubricating material may be manipulated in disconnecting and reconnecting it with accuracy and facility, whether the lubricator is or is not mounted upon a moving part of the engine and with the minimum degree of danger to the operator in the former case.

The invention consists in the improved attachment for lubricators and in the combination and arrangement of the various parts thereof, substantially as will be hereinafter pointed out and finally embodied in the clauses of the claim.

The invention is fully illustrated in the accompanying drawings, wherein—

Figure 1 shows in side elevation a lubricator provided with my attachment and arranged in operative position upon the eccentric-strap of an engine. Fig. 2 is a top plan view of a certain bracket forming a part of the said attachment, and Fig. 3 is a view in rear elevation of the upper portion of said attachment.

I have illustrated the attachment which forms the subject of my invention in connection with a lubricator of the nature of that set forth in my United States Letters Patent No. 629,583, granted July 25, 1899, and adapted for viscid or grease-like lubricants. It is to be understood, however, that the said attachment may be employed in connection with any lubricator of which it is necessary to disconnect a part in order to refill the receptacle thereof for the lubricating material.

The lubricator referred to as illustrated in the drawings consists of a cylindrical cup $a$, having a conical bottom $b$, from which projects downwardly the usual threaded thimble $c$, whereby the lubricator is secured in position, the bottom $b$ of the cup and the cup proper, $a$, being removably secured together by a union $d$, which according to the ordinary construction is screwed onto one of the parts (in this case the part $b$) and has a shoulder which engages a corresponding shoulder upon the other part. The union is provided with knobs $e$ for manipulating it.

A piston which is inclosed in the cup and which is carried by a threaded spindle $f$ is adapted to be slowly forced downwardly in the cup by the action of a weighted pendulum $g$, which, as the part moves upon which the lubricator is mounted, is oscillated, the action of the pendulum being transmitted through a suitable intermediate mechanism. The parts involved in the mechanism just referred to are not fully shown in the drawings for the reason that they have no direct bearing upon my invention. They will be found fully described and illustrated in my patent referred to.

The upper portion of the cup is constructed to form an enlargement or abutment $h$. Surrounding the cylindrical portion of the cup and taking against said enlargement or abutment is a circular band $i$, whose free ends $j$ are turned off parallel to each other and receive between them an arm $k$, through which and said ends extends a bolt $l$, provided with a securing-nut $m$. The arm $k$ forms an integral projection of a block $n$, having therein a preferably squared orifice $o$ and carrying a set-screw $p$.

$q$ designates a Y-joint which is secured upon the eccentric-strap $r$ for an eccentric $s$, carried upon the shaft $t$ of an engine. Into one arm $u$ of said Y-joint is screwed the lower end of a tube $v$, to the upper end of which is connected the nipple $c$ by a union $w$. In the other arm of the Y-joint is secured the lower end of a rod $x$, the upper end of which is provided with a reduced portion $y$, shaped to fit the orifice $o$ in the block $n$.

$z$ is a curved guard or clip which is secured upon the rod $x$ a short distance from its upper end and on the same side as is the set-screw $p$ when the parts are assembled.

When it becomes necessary to refill the lubricator, the operator places his right hand upon the upper end of the rod $x$, with his fourth finger under the clip or guard $z$ and the other fingers of that hand clasping the set-screw $p$. With his other hand he releases the union $d$. The parts $a$ and $b$ being now detached, with the free fingers of his right hand he releases the set-screw $p$, whose free end is binding against the reduced portion $y$ of the rod $x$, and so secures the bracket comprising the band $i$ and arm-carrying block $n$ in position. Having released the set-screw, the bracket may be lifted off the rod $x$, carrying with it the upper or cup portion of the lubricator, which after the piston has been reset may be refilled. In reassembling the parts the operation is just reversed, the reduced extension $y$ of the rod $x$ forming a guide whereby the union will be brought accurately into place with reference to the top of the part $b$, so that all that is necessary in order to secure the parts together is to turn the union, and thus effect the proper engagement between its threading and that of the part $b$. The clip or guard $z$ is of great value in preventing the right hand of the operator as it manipulates the set-screw from being thrown off the attachment, as the same rapidly vibrates, into dangerous proximity to some moving part, as the fly-wheel $a'$, (shown in dotted lines in the drawings.)

Though I have shown the tube $v$ which supports the lubricator as a part of the attachment, it is to be understood that I am not correspondingly limited, for any sort of support for the lubricator will suffice so long as it sustains the portion $b$ of said lubricator immovable with reference to the guiding part $y$ of the attachment.

Having thus fully described my invention, what I claim as new, and desire to secure by Letters Patent, is—

1. The combination, with a lubricator comprising two parts of which one is disconnective from the other for the purpose of refilling the lubricator, of a suitable support for one of said parts, and a guide for the other part, said guide being immovable with reference to said support, substantially as described.

2. The combination, with a lubricator comprising two parts of which one is disconnective from the other for the purpose of refilling the lubricator, of a suitable support for one of said parts, a guide for the other part adapted to facilitate the assembling of said parts, said guide being immovable with reference to said support, and a hand-guard carried by said guide substantially as described.

3. The combination, with a lubricator comprising two parts of which one is disconnective from the other for the purpose of refilling the lubricator, of a suitable support for one of said parts adapted to be carried by one of the parts of the bearing to be lubricated, a bracket connected to the other part of said lubricator, and a guide-rod for said bracket adapted to facilitate the assembling of said parts, said guide-rod being carried by said part of the bearing to be lubricated and being immovable with reference to said support, substantially as described.

4. The combination, with a lubricator comprising two parts of which one is disconnective from the other for the purpose of refilling the lubricator, of a suitable support for one of said parts adapted to be carried by one of the parts of the bearing to be lubricated, a bracket connected to the other part of said lubricator, a guide-rod for said bracket adapted to facilitate the assembling of said parts, and a hand-guard carried by said guide-rod, said guide-rod being carried by said part of the bearing to be lubricated and being immovable with reference to said support, substantially as described.

5. The combination, with a lubricator comprising two disconnective parts, of a discharge-pipe carrying one of said parts and adapted to be mounted upon a part of the bearing to be lubricated, a rod rigidly connected to said pipe at one of its ends, and a bracket carrying the other part of said lubricator and removably secured on said rod, substantially as described.

In testimony that I claim the foregoing I have hereunto set my hand this 6th day of July, 1900.

GRANT U. MERRILL.

Witnesses:
 JOHN W. STEWARD,
 ALFRED GARTNER.